United States Patent
Yoshida

(10) Patent No.: US 8,030,863 B2
(45) Date of Patent: Oct. 4, 2011

(54) MOTOR DRIVE DEVICE AND VEHICLE PROVIDED WITH THE SAME

(75) Inventor: Tadafumi Yoshida, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 497 days.

(21) Appl. No.: 12/097,178

(22) PCT Filed: Dec. 13, 2006

(86) PCT No.: PCT/JP2006/325322
§ 371 (c)(1),
(2), (4) Date: Jun. 12, 2008

(87) PCT Pub. No.: WO2007/069779
PCT Pub. Date: Jun. 21, 2007

(65) Prior Publication Data
US 2009/0289583 A1    Nov. 26, 2009

(30) Foreign Application Priority Data

Dec. 14, 2005    (JP) .................................. 2005-360638

(51) Int. Cl.
*H02P 6/14* (2006.01)
(52) U.S. Cl. .................... 318/400.01; 318/471; 318/599
(58) Field of Classification Search ............. 318/400.01, 318/471, 599; 310/54
See application file for complete search history.

(56) References Cited

U.S. PATENT DOCUMENTS

| | | | |
|---|---|---|---|
| 5,923,135 A * | 7/1999 | Takeda | 318/432 |
| 6,097,171 A * | 8/2000 | Branecky | 318/808 |
| 6,201,365 B1 * | 3/2001 | Hara et al. | 318/558 |
| 7,187,154 B2 * | 3/2007 | Ta et al. | 318/799 |
| 7,210,304 B2 * | 5/2007 | Nagashima et al. | 62/259.2 |
| 7,462,963 B2 * | 12/2008 | Ishihara et al. | 310/58 |
| 7,607,827 B2 * | 10/2009 | Karikomi et al. | 374/141 |

FOREIGN PATENT DOCUMENTS

| | | | |
|---|---|---|---|
| JP | 2-84011 A | 3/1990 | |
| JP | 7-79592 A | 3/1995 | |
| JP | 7143615 A | 6/1995 | |
| JP | 11-294164 A | 10/1999 | |
| JP | 2003-18861 A | 1/2003 | |
| JP | 2004-288650 A | 10/2004 | |
| JP | 2004-324613 A | 11/2004 | |

* cited by examiner

*Primary Examiner* — Walter Besnon
*Assistant Examiner* — David Luo
(74) *Attorney, Agent, or Firm* — Sughrue Mion, PLLC

(57) ABSTRACT

A control device converts a torque instruction value of an AC motor into a current instruction of AC motor, and employs current control in which feedback is performed by PI control to match an actual current value with the current instruction. Further, the control device sets a target flow rate of cooling water flowing through a coolant passage based on the converted current instruction, produces a signal for driving a water pump to circulate the cooling water at the target flow rate thus set and provides the signal to the water pump. A revolution speed of the water pump is restricted according to a signal of the control device such that the cooling water circulates through the coolant passage at the flow rate matching with the target flow rate.

4 Claims, 5 Drawing Sheets

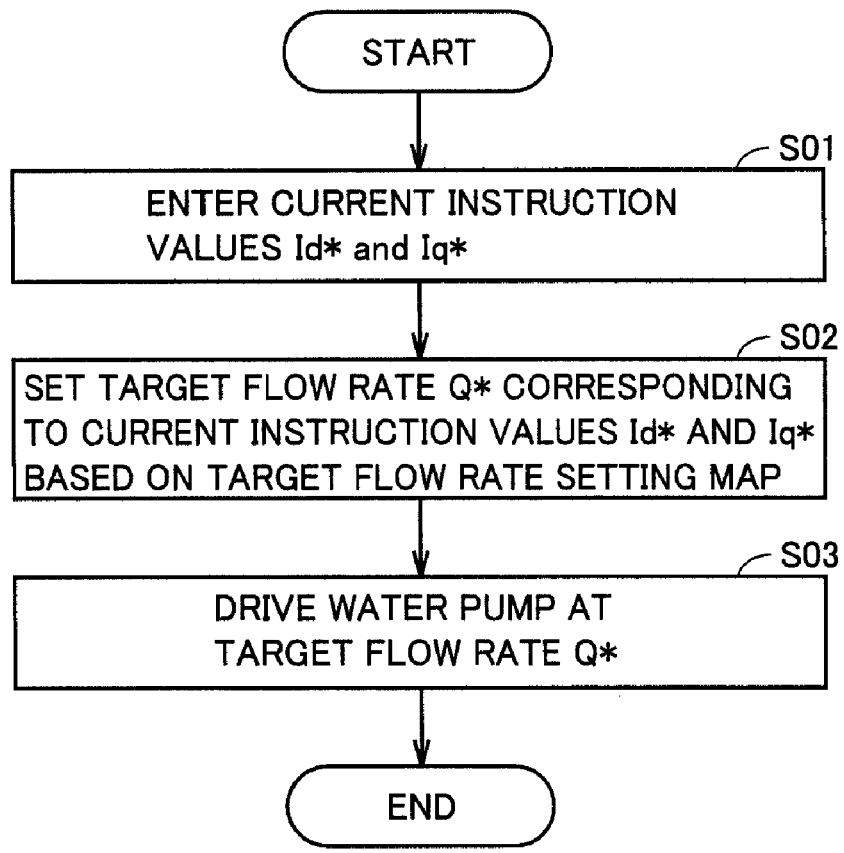

MOTOR DRIVE DEVICE AND VEHICLE PROVIDED WITH THE SAME

TECHNICAL FIELD

The invention relates to a motor drive device and a vehicle provided with the same, and particularly to a motor drive device that can achieve both thermal protection and low electric power consumption of a drive circuit that drives and controls a motor as well as a vehicle provided with the same.

BACKGROUND ART

Usually, vehicles such as an Electric Vehicle (EV) and a Hybrid Vehicle (HV) obtain a drive power from an electric energy by converting a DC power supplied from a high-voltage battery into a three-phase AC power by an inverter and driving a three-phase AC motor by the three-phase AC power. Conversely, during a decelerating operation of the vehicle, a regenerative energy obtained by regenerative power generation of the three-phase AC motor is stored in the battery so that the driving is performed without wasting the energy.

In the above hybrid vehicles and electric vehicles, the inverter generates heat due to a switching operation of a switching element, and therefore may be thermally destroyed. For protecting the inverter from overheating, a cooling device is employed for the inverter (see, e.g., Japanese Patent Laying-Open Nos. 2003-018861, 2004-324613 and 11-294164).

Various cooling control devices for inverters have been studied. In an example, a temperature sensor is arranged near a cooler of an inverter, and a loss (heat value) of a switching element is arithmetically obtained from a temperature of the cooler sensed by the temperature sensor. A temperature of a joint portion where the switching element is joined to a substrate is arithmetically obtained based on the temperature of the cooler and the loss of the switching element, and the activation and deactivation of a water pump passing the cooling water through the cooler and on/off of a radiator fan for cooling the cooling water are controlled based on the temperature of the joint portion.

As another example, Japanese Patent Laying-Open No. 2003-018861 has disclosed an inverter cooling control device including cooling means that cools switching elements included in a plurality of inverters, respectively, temperature estimating means that estimates a temperature of a joint portion of the switching element of each inverter, and drive means that controls a cooling temperature of a coolant of the cooling means based on the estimated joint portion temperature.

More specifically, the temperature estimating means arithmetically obtains the joint portion temperature of the switching element of each inverter by thermally modeling the temperature of the inverter sensed by a temperature sensor, coolant and thermal resistances of the plurality of inverters. The drive means drives and controls a water pump and a radiator fan based on the arithmetically obtained joint portion to control the temperature of the coolant, and thereby controls the cooling capacity or power by controlling the coolant temperature. This structure can arithmetically obtain the joint portion temperature with precision. Therefore, an operation frequency of the drive means can be reduced and the power consumption can be suppressed, as compared with a conventional cooling control device of an inverter that cannot arithmetically obtains joint portion temperatures of a plurality of inverters with precision.

In the conventional cooling control device of the inverter described above, however, the estimation of the joint portion temperature of the switching element in the inverter can be performed with high precision, but requires complicated arithmetic processing. This results in a problem that the control of the cooling capacity of the cooler performed by the drive means cannot follow the actual rising of the joint portion temperature.

For example, when a motor drive current passing through the inverter rapidly increases in response to rapid variations in required motor output, a rising rate of the joint portion temperature is high so that it is necessary to increase rapidly the cooling capacity of the cooler. However, the cooler is controlled only after the temperature estimating means executes the estimation. Therefore, it is difficult to suppress the rising of the joint portion temperature, and may cause thermal destruction of the inverter.

For ensuring a control response of the cooler, such a manner may be employed that controls the cooler while fixing the cooling capacity at the value that is required when a thermal load attains the maximum, independently of the joint portion temperature.

However, this manner unnecessarily increases the power consumption of the cooler, and therefore may impair fuel efficiency of a vehicle equipped with the cooling control device of the inverter.

The invention has been made for overcoming the above problems, and an object of the invention is to provide a motor drive device that can achieve thermal protection of a drive circuit that drives and controls a motor as well as low electric power consumption of a cooling device.

DISCLOSURE OF THE INVENTION

According to the invention, a motor drive device includes a drive circuit performing electric power conversion between a power supply and a motor by a switching operation of a switching element; a control device performing switching control on the switching element such that a drive current of the motor matches with a current instruction produced from a required output of the motor; a cooling device cooling the drive circuit with coolant; and a cooling device control device controlling a quantity of the coolant supplied to the drive circuit based on the current instruction.

The motor drive device described above can supply the coolant, with good response, to the drive circuit of which temperature rising is expected. Therefore, the drive circuit can be reliably protected from overheating. Further, the motor drive device can appropriately set the supply quantity of the coolant with respect to a magnitude of temperature rising of the drive circuit that varies according to the required motor output. Thereby, the electric power consumption of the cooling device can be improved as compared with the conventional motor drive device in which the supply quantity of the coolant must always be set to the allowed maximum supply quantity of the cooling device due to inferior response. This improves the fuel consumption of the vehicle equipped with the motor drive device.

Preferably, the cooling device control device holds a map representing a relationship between the current instruction and the supply quantity of the coolant set based on a quantity of generated heat of the switching element estimated from the current instruction, and determines the supply quantity of the coolant corresponding to the current instruction with reference to the map.

The above motor drive device can set the supply quantity of the coolant without performing complicated arithmetic processing, and therefore can supply the coolant with good response. Further, the supply quantity of the coolant is variable according to the magnitude of the temperature rising of the drive circuit so that both the thermal protection of the drive circuit and the reduction of the electric power consumption can be achieved.

According to the invention, a vehicle includes a wheel; a motor driving the wheel; and one of the foregoing motor drive devices driving the motor.

According to the above vehicle, the electric power consumption of the cooling device is low so that the fuel consumption can be improved.

The invention can achieve both the thermal protection of the drive circuit that drives and controls the motor as well as the reduction of the electric power consumption of the cooling device. Consequently, the fuel consumption can be improved in the vehicle equipped with the motor drive device according to the invention.

BRIEF DESCRIPTION OF THE DRAWINGS

FIG. 6 is a flowchart illustrating the drive control of the water pump according to the embodiment of the invention.

BEST MODES FOR CARRYING OUT THE INVENTION

An embodiment of the invention will now be described with reference to the drawings. In the following drawing, the same or corresponding portions bear the same reference numbers.

Figure 1:
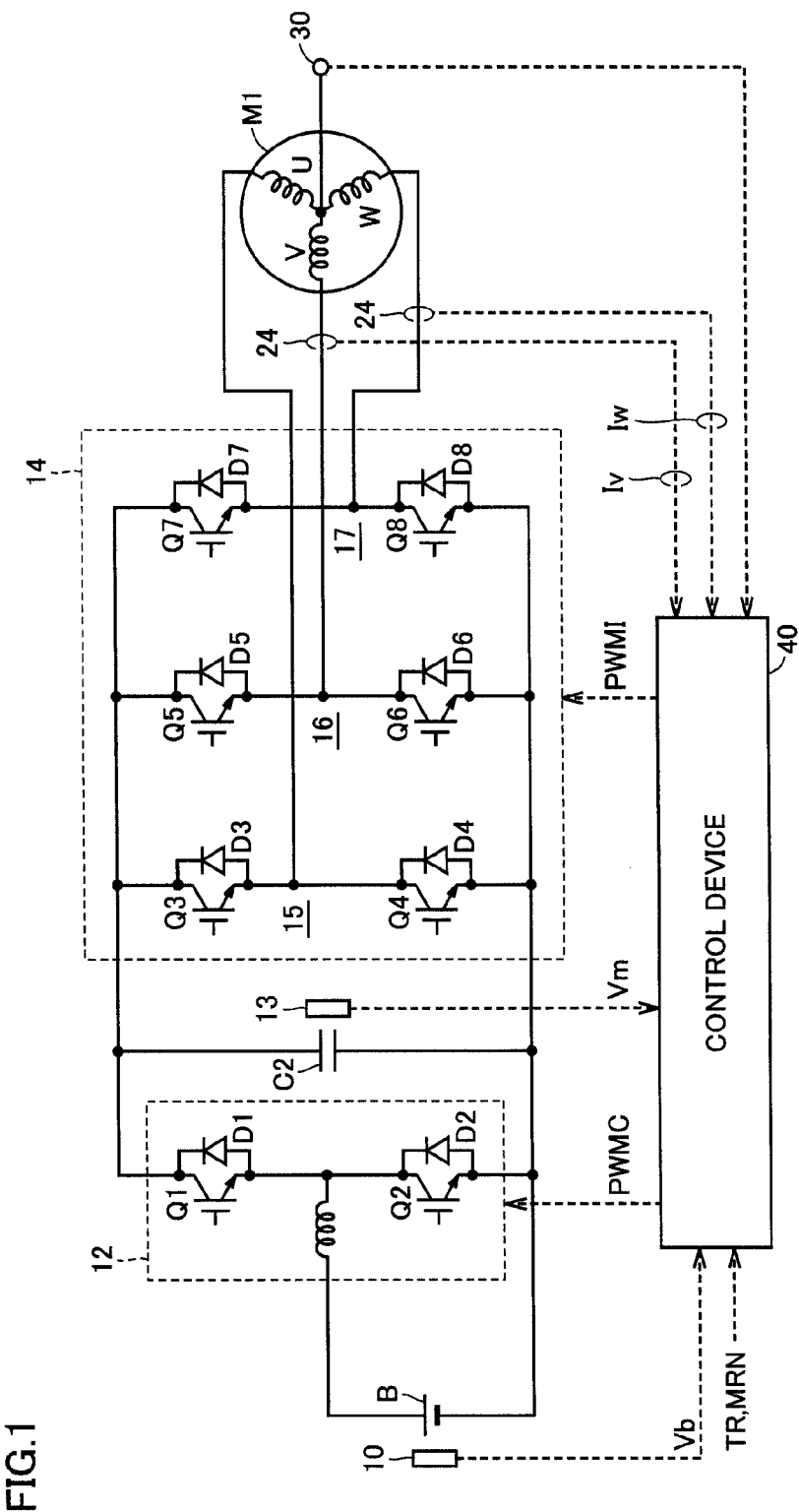
FIG. 1 is a schematic block diagram of a motor drive device according to an embodiment of the invention.

FIG. 1 is a schematic block diagram showing a motor drive device according to an embodiment of the invention.

Referring to FIG. 1, a motor drive device 100 includes a battery B, voltage sensors 10 and 13, a current sensor 24, a capacitor C2, a booster converter 12, an inverter 14, a resolver 30 and a control device 40.

An AC motor M1 is a drive motor for generating a torque that drives drive wheels of a hybrid vehicle or an electric vehicle. AC motor M1 has a function as a power generator driven by an engine, and can also operate as an electric motor with respect to the engine, e.g., for starting the engine.

Booster converter 12 includes a reactor L1, NPN transistors Q1 and Q2, and diodes D1 and D2.

One end of reactor L1 is connected to a power supply line of battery B, and the other end is connected to a node between NPN transistors Q1 and Q2, and specifically to a node between an emitter of NPN transistor Q1 and a collector of NPN transistor Q2.

NPN transistors Q1 and Q2 are connected in series between a power supply line and a ground line. A collector of NPN transistor Q1 is connected to the power supply line, and an emitter of NPN transistor Q2 is connected to the ground line. Each of diodes D1 and D2 is arranged between the emitter and the collector of corresponding NPN transistor Q1 or Q2, and passes a current from the emitter to the collector connected thereto.

Inverter 14 is formed of U-, V- and W-phase arms 15, 16 and 17, which are arranged in parallel between the power supply line and the ground line.

U-phase arm 15 is formed of NPN transistors Q3 and Q4 connected in series. V-phase arm 16 is formed of NPN transistors Q5 and Q6 connected in series. W-phase arm 17 is formed of NPN transistors Q7 and Q8 connected in series. Diodes D3-D8 are arranged between collectors and emitters of NPN transistors Q3-Q8, respectively, and each pass the current from the emitter to the collector of the corresponding transistor.

Midpoints of these phase arms are connected to phase ends of the respective phase coils of motor M1, respectively. Thus, AC motor M1 is a three-phase permanent magnet motor, and ends on one side of respective coils of U-, V- and W-phases are commonly connected to a center point. The other end of the U-phase coil is connected to the node between NPN transistors Q3 and Q4, the other end of the V-phase coil is connected to the node between NPN transistors Q5 and Q6, and the other end of the W-phase coil is connected to the node between NPN transistors Q7 and Q8.

Switching elements included in booster converter 12 and inverter 14 are not restricted to NPN transistors Q1-Q8, and may be formed of other types of power elements such as IGBTs (Insulated Gate Bipolar Transistors) or MOSFETs.

Motor drive device 100 may be configured such that battery B and inverter 14 are directly connected together without interposing booster converter 12 therebetween.

Battery B may be formed of a secondary battery, e.g., of nickel hydrogen or lithium ion, or a fuel battery. A capacitor of a large capacity such as an electrical double layer capacitor may be used. Voltage sensor 10 senses a DC voltage Vb provided from battery B, and provides sensed DC voltage Vb to control device 40.

Booster converter 12 boosts the DC voltage supplied from battery B and supplies it to capacitor C2. More specifically, when booster converter 12 receives a signal PWMC from control device 40, it boosts the DC voltage corresponding to a period for which signal PWMC keeps NPN transistor Q2 in the on state, and supplies the boosted DC voltage to capacitor C2.

When booster converter 12 receives signal PWMC from control device 40, it steps down the DC voltage supplied from inverter 14 via capacitor C2, and supplies it to battery B.

Capacitor C2 smoothes the DC voltage provided from booster converter 12, and supplies the smoothed DC voltage to inverter 14.

Voltage sensor 13 senses a voltage Vm placed between opposite ends of capacitor C2 (and corresponding to an input voltage of inverter 14), and provides sensed voltage Vm to control device 40.

When inverter 14 is supplied with a DC voltage from capacitor C2, it converts the DC voltage into an AC voltage based on a signal PWMI from control device 40, and drives AC motor M1. Thereby, AC motor M1 is driven to generate a required torque designated by a torque instruction value TR.

During regenerative braking of the hybrid vehicle or the electric vehicle equipped with motor drive device 100, inverter 14 converts the AC voltage generated by AC motor M1 into the DC voltage based on signal PWMI from control device 40, and supplies the converted DC voltage to booster converter 12 via capacitor C2.

The above regenerative braking includes braking performed together with regenerative power generation when a driver of the hybrid vehicle or the electric vehicle operates a foot brake, and also includes deceleration (or stop of acceleration) of the vehicle performed together with regenerative power generation by releasing an accelerator pedal during driving.

Current sensor 24 senses motor currents Iv and Iw flowing through AC motor M1, and provides sensed motor currents Iv and Iw to control device 40. FIG. 1 shows only two current sensors 24 for the following reason. When AC motor M1 is a three-phase motor, it is required to sense motor currents Iv and Iw flowing through two phases, and motor current Iu flowing through the remaining phase can be arithmetically obtained based on sensed motor currents Iv and Iw. Therefore, three current sensors 24 may be employed for individually sensing motor currents Iu, Iv and Iw flowing through the three phases, respectively.

Resolver 30 is attached to a rotation shaft of AC motor M1, and senses a rotation angle θ of a rotator of AC motor M1 for providing it to control device 40.

Control device 40 receives torque instruction value TR and motor revolution speed MRN from an external ECU (Electronic Control Unit), receives output voltage Vm from voltage sensor 13, receives DC voltage Vb from voltage sensor 10, receives motor currents Iv and Iw from current sensor 24, and receives rotation angle θ from resolver 30. Based on output voltage Vm, torque instruction value TR, motor currents Iv and Iw, and rotation angle θ, control device 40 provides signal PWMI for performing switching control on NPN transistors Q3-Q8 of inverter 14 when inverter 14 drives AC motor M1 in a manner to be described later, and provides signal PWMI thus produced to inverter 14.

Also, based on DC voltage Vb, output voltage Vm, torque instruction value TR and motor revolution speed MRN, control device 40 produces signal PWMC for performing switching control on NPN transistors Q1 and Q2 of booster converter 12 in a manner to be described later when inverter 14 drives AC motor M1, and provides signal PWMC thus produced to booster converter 12.

Further, during the regenerative braking of the hybrid vehicle or the electric vehicle equipped with motor drive device 100, control device 40 produces signal PWMI for converting the AC voltage generated by AC motor M1 into a DC voltage based on output voltage Vm, torque instruction value TR and motor currents Iv and Iw, and provides signal PWMI thus produced to inverter 14. In this case, the switching control of NPN transistors Q3-Q8 of inverter 14 is performed by signal PWMI. Thereby, inverter 14 converts the AC voltage generated by AC motor M1 into the DC voltage, and supplies it to booster converter 12.

Further, based on DC voltage Vb, output voltage Vm, torque instruction value TR and motor revolution speed MRN, control device 40 produces signal PWMC for stepping down the DC voltage supplied from inverter 14 during the regenerative braking, and provides signal PWMC thus produced to booster converter 12. Thereby, the AC voltage generated by AC motor M1 is converted into the DC voltage, is stepped down and is supplied to battery B.

In motor drive device 100 having the above structure, inverter 14 requires cooling for suppressing rising of temperature due to a thermal loss of a switching element. Therefore, motor drive device 100 further includes a cooling system of inverter 14 shown in FIG. 2.

Figure 2:
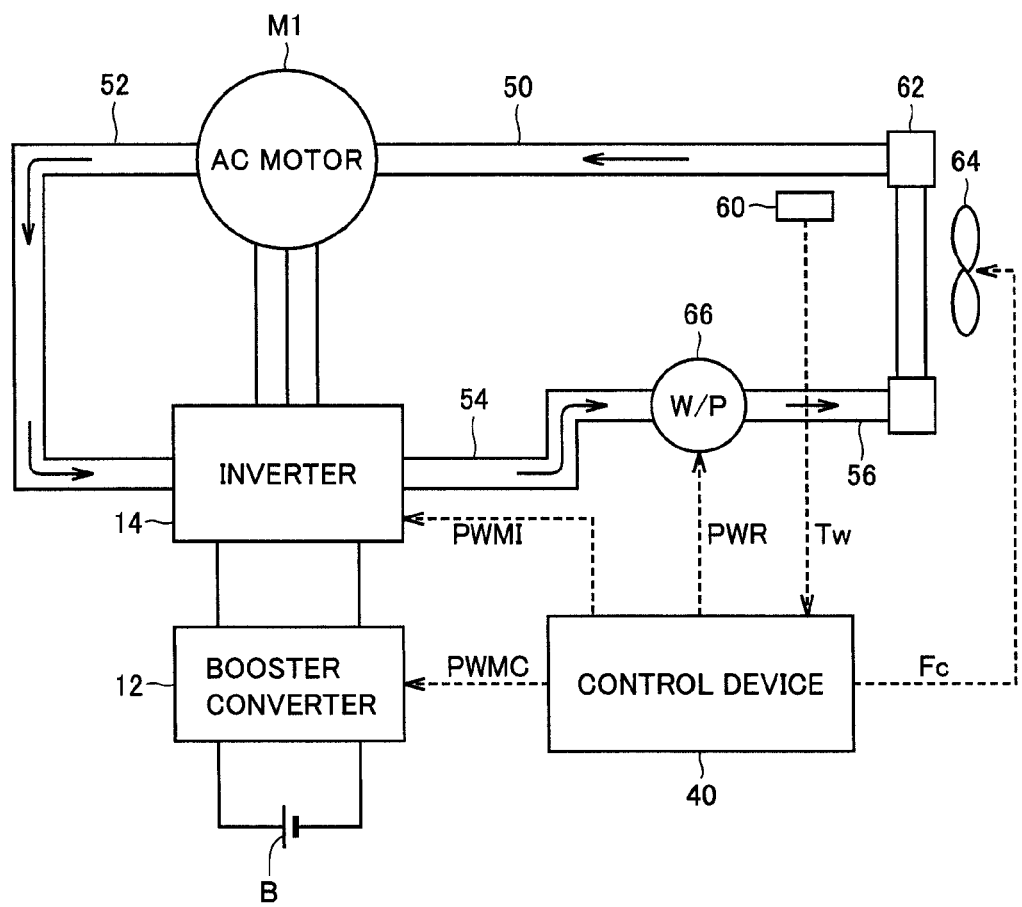
FIG. 2 is a block diagram showing a structure of a cooling system of an inverter.

FIG. 2 is a block diagram showing a structure of the cooling system of inverter 14.

Referring to FIG. 2, the cooling system includes inverter 14, AC motor M1, coolant passages 50-56, a temperature sensor 60, a radiator 62 and a water pump 66.

Coolant passage 50 is formed between a first port of radiator 62 and AC motor M1, a coolant passage 52 is formed between AC motor M1 and inverter 14, a coolant passage 54 is formed between inverter 14 and water pump 66, and a coolant passage 56 is formed between water pump 66 and a second port of radiator 62. Thus, coolant passages 50-56 connect AC motor M1, inverter 14 and water pump 66 together in series.

Water pump 66 is a pump for circulating cooling water such as an antifreezing fluid, and circulates the cooling water in a direction indicated by arrows in the figure. Radiator 62 receives from coolant passage 56 the cooling water that circulated through AC motor M1 and inverter 14, and cools the received cooling water with a radiator fan 64. Temperature sensor 60 is arranged on coolant passage 50, senses a temperature (which may also be referred to as a "cooling water temperature" hereinafter) Tw of the cooling water and provides sensed cooling water temperature Tw to control device 40.

In the above description, AC motor M1, inverter 14 and water pump 66 are arranged in this order when viewed downstream from radiator 62. However, the arrangement order of them is not restricted to the above.

As shown in FIG. 1, control device 40 produces signals PWMI and PWMC for driving and controlling inverter 14 and booster converter 12, and provides them to inverter 14 and booster converter 12, respectively.

Further, control device 40 produces a signal PWR for driving and controlling water pump 66 in a manner to be described alter, and provides signal PWR thus produced to water pump 66.

Control device 40 produces a signal FC for driving and controlling radiator fan 64 based on cooling water temperature Tw, and provides signal FC thus produced to radiator fan 64. More specifically, control device 40 produces signal FC for driving radiator fan 64 in response to the fact that cooling water temperature Tw sensed by temperature sensor 60 exceeds a predetermined set temperature, and provides signal FC to radiator fan 64. Thereby, radiator fan 64 operates to blow external air to radiator 64 for cooling the cooling water by the air.

Description will now be given on the drive control of water pump 66 in the cooling system of inverter 14 according to the embodiment of the invention having the above structure.

Figure 3:
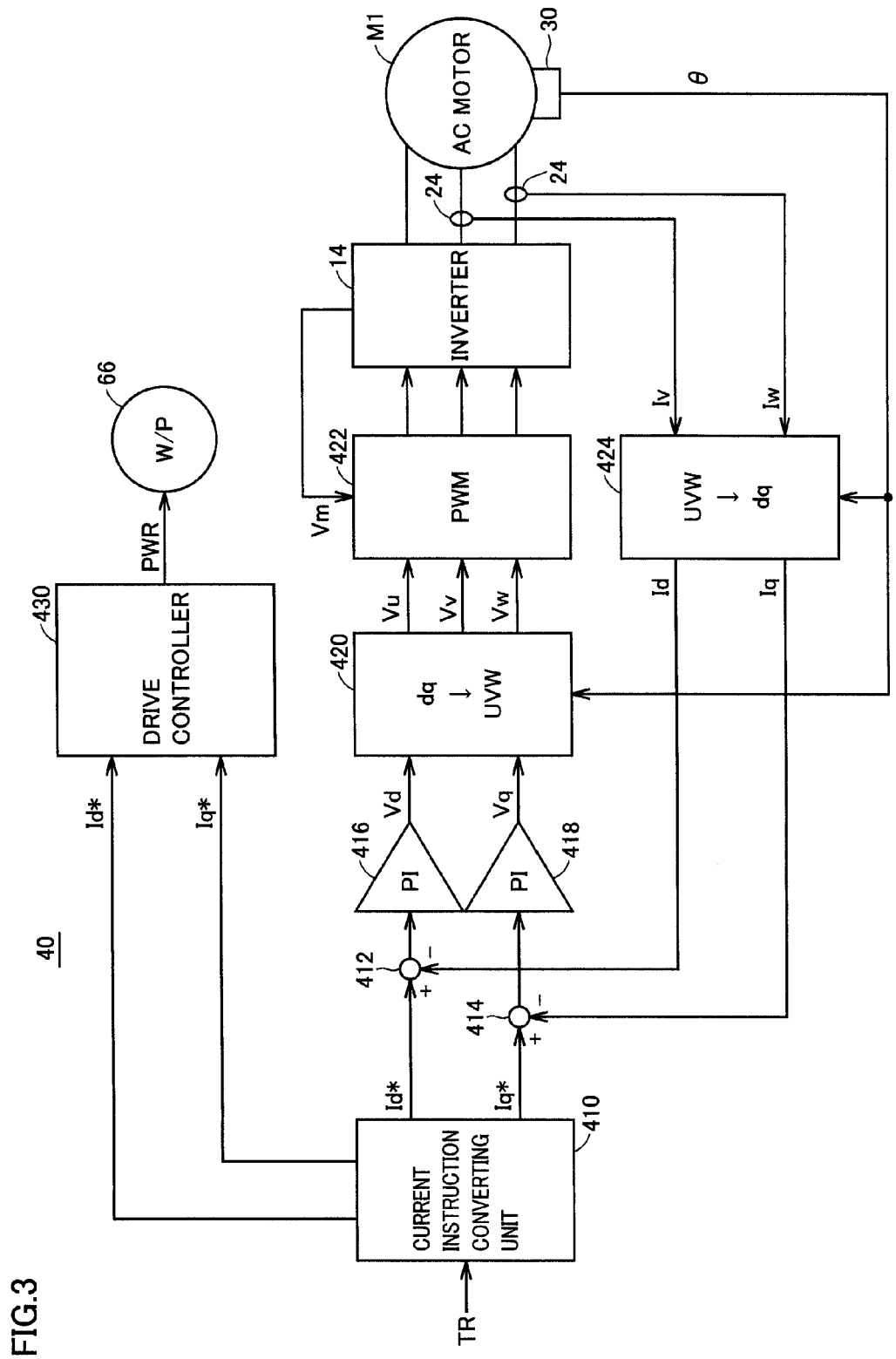
FIG. 3 is a functional block diagram of a control device in FIG. 2.

FIG. 3 is a functional block diagram of control device 40 in the FIG. 2.

Referring to FIG. 3, control device 40 includes an inverter control circuit, a converter control circuit (not shown) and a drive controller 430 driving and controlling the water pump.

The inverter control circuit is formed of a current instruction converting unit 410, subtractors 412 and 414, PI controllers 416 and 418, a two-to-three phase converting unit 420, a PWM producing unit 422 and a three-to-two phase converting unit 424.

Three-to-two phase converting unit 424 receives motor currents Iv and Iw from two current sensors 24, respectively. Three-to-two phase converting unit 424 arithmetically obtains motor current Iu (=−Iv−Iw) based on motor currents Iv and Iw.

Further, three-to-two phase converting unit 424 performs three-to-two phase conversion on motor currents Iu, Iv and Iw using rotation angle θ provided from resolver 30. Thus, three-to-two phase converting unit 424 converts motor currents Iu, Iv and Iw flowing through the respective phases of the three-phase coil of AC motor M1 into current values Id and Iq flowing on d- and q-axes, respectively, using rotation angle θ. Three-to-two phase converting unit 424 provides arithmetically obtained current value Id to subtractor 412, and provides arithmetically obtained current value Iq to subtractor 414.

Current instruction converting unit 410 receives torque instruction value TR and motor revolution speed MRN from the external ECU, and receives voltage Vm from voltage sensor 13. Based on torque instruction value TR, motor revolution speed MRN and voltage Vm, current instruction converting unit 410 produces current instructions Id* and Iq* for outputting a required torque designated by torque instruction value TR, and provides current instructions Id* and Iq* thus produced to subtractors 412 and 414, respectively.

In this operation, current instruction converting unit 410 also provides current instructions Id* and Iq* thus produced to drive controller 430 of water pump 66.

Subtractor 412 receives current instruction Id* from current instruction converting unit 410, and receives current value Id from three-to-two phase converting unit 424. Subtractor 412 arithmetically obtains a deviation (=Id*−Id) between current instruction Id* and current value Id, and provides the obtained deviation to PI controller 416. Subtractor 414 receives current instruction Iq* from current instruction converting unit 410, and receives current value Iq from three-to-two phase converting unit 432. Subtractor 414 arithmetically obtains a deviation (=Iq*−Iq) between current instruction Iq* and current value Iq, and provides the obtained deviation to PI controller 418.

PI controllers 416 and 418 arithmetically obtain voltage manipulation variables Vd and Vq, using PI gains with respect to deviations (Id*−Id) and (Iq*−Iq), and provide voltage manipulation variables Vd and Vq thus obtained to two-to-three phase converting unit 420, respectively.

Two-to-three phase converting unit 420 performs two-to-three phase conversion on voltage manipulation variables Vd and Vq provided from PI controllers 416 and 418, respectively, using rotation angle θ provided from resolver 30. Thus, two-to-three phase converting unit 420 converts voltage manipulation variables Vd and Vq to be applied to d- and q-axes, respectively, into voltage manipulation variables Vu, Vv and Vw to be applied to the three phase coils of AC motor M1, respectively, using rotation angle θ. Two-to-three phase converting unit 420 provides voltage manipulation variables Vu, Vv and Vw to PWM producing unit 422.

PWM producing unit 422 produces signal PWMI based on voltage manipulation variables Vu, Vv and Vw as well as voltage Vm provided from voltage sensor 13, and provides signal PWMI thus produced to inverter 14.

As described above, the inverter control circuit converts the required torque (corresponding to torque instruction value TR) of AC motor M1 into current instructions Id* and iq* of d- and q-axis components of AC motor M1, and performs the feedback on them by the PI control such that actual current values Id and Iq may match with current instructions Id* and Iq*, respectively. Thus, the inverter control circuit employs so-called current control.

Drive controller 430 driving and controlling water pump 66 sets a target flow rate Q* of the cooling water flowing through coolant passages 50-56 based on current instructions Id* and Iq* used for this current control. It is assumed that target flow rate Q* is set based on a relationship between target flow rate Q* and current instructions Id* and Iq* that are already obtained.

Figure 4:
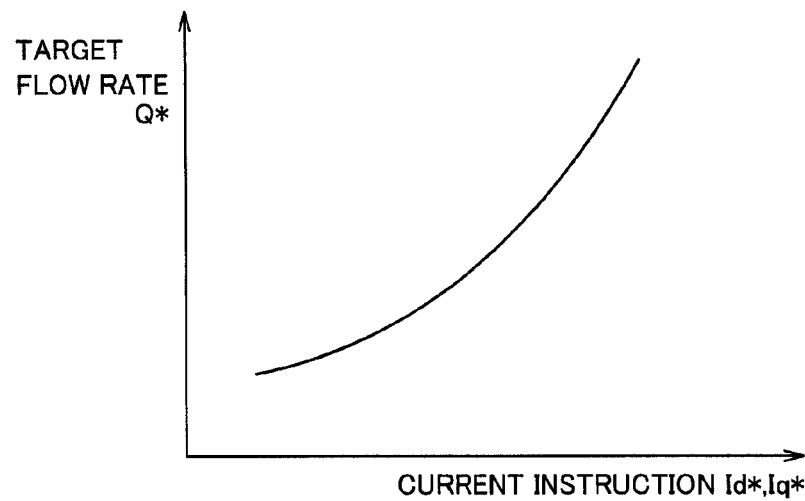
FIG. 4 showing a relationship between a target flow rate Q* and current instructions Id* and Iq*.

FIG. 4 shows a relationship between target flow rate Q* and current instructions Id* and Iq*.

Referring to FIG. 4, target flow rate Q* is set to increase with current instructions Id* and Iq*. Target flow rate Q* with respect to certain current instructions Id* and Iq* may be set, e.g., such that processing is performed to estimate a quantity of heat that is generated from inverter 14 per unit time when motor currents Id and Iq controlled to match with current instructions Id* and iq*, respectively, flow through the plurality of switching elements in inverter 14, and a quantity of heat that can be released per unit time by circulating the cooling water corresponding to target flow rate Q* may exceed the above estimated quantity of heat generated from inverter 14.

Drive controller 430 stores the relationship between target flow rate Q* and current instructions Id* and iq* in FIG. 4 as a target flow rate setting map in a storage area (not shown). When drive controller 430 receives current instructions Id* and Iq*, it extracts target flow rate Q* corresponding to them from the target flow rate setting map, and sets it as target flow rate Q*. Drive controller 430 produces signal PWR for driving water pump 66 to circulate the cooling water at target flow rate Q* thus set, and provides it to water pump 66. Water pump 66 operates at the revolution speed controlled according to signal PWR of drive controller 430, and circulates the cooling water through coolant passages 50-56 at the flow rate equal to target flow rate Q*.

As described above, the cooling system of inverter 14 according to the embodiment of the invention is characterized in that the drive control of water pump 66 is performed based on current instructions Id* and iq* used for the current control of inverter 14. This feature can offer the following advantages.

Figure 5:
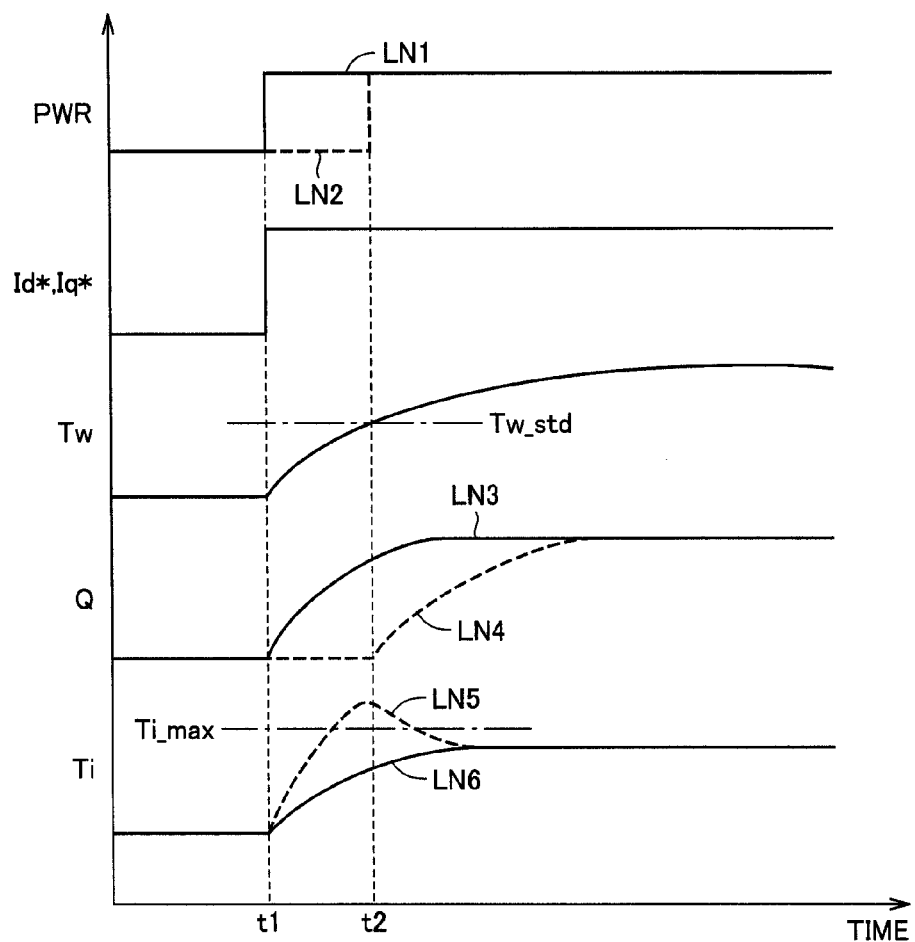
FIG. 5 is a timing chart for illustrating drive control of a water pump according to the embodiment of the invention.

FIG. 5 is a timing chart for illustrating the drive control of the water pump according to the embodiment of the invention. More specifically, FIG. 5 shows changes that occur with time in signal PWR, current instructions Id* and Iq*, cooling water temperature Tw, a flow rate Q of the cooling water circulating through the coolant passages, and element temperatures of NPN transistors Q3-Q8 in inverter 14.

For the comparison with the embodiment of the invention, FIG. 5 also shows by broken lines the changes in various values that occur with time in the case where water pump 66 is driven and controlled based on the sensed value of cooling water temperature Tw provided from the temperature sensor.

Referring to FIG. 5, it is first assumed that current instructions Id* and Iq* rapidly increase in response to rapid variations in required motor output at a time t1.

At and after time t1, the inverter control circuit in control device 40 controls motor currents Id and Iq based on current instructions Id* and Iq* that are rapidly increased in the foregoing manner. Further, in parallel with this current control, drive controller 430 extracts corresponding target flow rate Q* from the target flow rate setting map in FIG. 4, based on current instructions Id* and Iq* provided from current instruction converting unit 410. Drive controller 430 produces signal PWR for circulation at extracted target flow rate Q* (corresponding to solid line LN1 in FIG. 5), and provides produced signal PWR to water pump 66.

When water pump 66 receives signal PWR from drive controller 430 at time t 1, it increases the revolution speed in response to signal PWR. Thereby, flow rate Q of the cooling water circulating through coolant passages 50-58 gradually increases at and after time t1 as indicated by solid line LN3 in the figure.

In inverter 14, the current control is performed based on rapidly increased current instructions Id* and iq* at and after time t1, and thereby motor currents Id and Iq gradually rise toward the target values, i.e., current instructions Id* and Iq*, respectively. With the rising of the motor currents, the thermal loss in NPN transistors Q3-Q8 of inverter 14 increases. Therefore, as indicated by solid line LN6 in the figure, element temperatures Ti of respective NPN transistors Q3-Q8 gradually rise at and after time t1.

In NPN transistors Q3-Q8 of inverter 14, element temperature Ti has an upper limit temperature Ti_max that can ensure the protection from thermal deterioration. When element temperature Ti exceeds upper limit temperature Ti_max, the possibility of damaging NPN transistors Q3-Q8 increases.

According to the embodiment of the invention, however, flow rate Q of the cooling water circulating through coolant passages 50-56 increases with rising of element temperature Ti, as can be seen from solid lines LN6 and LN3 in the figure. Thus, in inverter 14, the quantity of heat released to coolant passages 50-56 increases with the quantity of generated heat so that rapid rising of the temperature is suppressed. Consequently, element temperature Ti can be held at or below upper limit temperature Ti_max.

The drive control of water pump 66 based on current instructions Id* and Iq* is performed as described above, and the drive control based on cooling water temperature Tw is performed as follows.

Specifically, when motor currents Id and Iq rise in response to rapid increase in current instructions Id* and Iq* at time t1, the thermal losses in NPN transistors Q3-Q8 increase, and each element temperature Ti rapidly rises as indicated by broken line LN5.

Since the quantity of generate heat in inverter 14 rises according to the rising of element temperature Ti, cooling water temperature Tw sensed by temperature sensor 60 gradually rises at and after time t1.

During the above operation, the control device determines whether the sensed value of cooling water temperature Tw exceeds a predetermined threshold Tw_std or not. When it is determined at a time t2 that cooling water temperature Tw has exceeded a predetermined threshold Tw_std, the control device produces signal PWR for driving and controlling water pump 66 for keeping cooling water temperature Tw at or below threshold Tw_std, as indicated by broken line LN2 in the figure.

When water pump 66 increases its revolution speed in response to signal PWR, flow rate Q of the cooling water circulating through coolant passages 50-56 gradually increases at and after time t2, as indicated by broken line LN4 in the figure.

However, the increase in flow rate Q of the cooling water starts at time t2 delayed from time t1 when element temperature Ti actually started to rise. As indicated by broken line LN5 in FIG. 5, therefore, the cooling performance cannot follow the rising of element temperature Ti if it rises rapidly so that there is a possibility that element temperature Ti exceeds upper limit value Ti_max. Thus, the drive control of water pump 66 based on cooling water temperature Tw is inferior in control response of the cooling capacity with respect to the temperature rising of inverter 14 so that it is impossible to prevent reliably the overheating of inverter 14.

In connection with the above point, since the embodiment of the invention controls the cooling capacity based on current instructions Id* and Iq*, it is possible to improve the control response to the temperature rising of inverter 14 and therefore to protect reliably inverter 14. Further, in contrast to the conventional cooling control device already described, the embodiment does not require the complicated arithmetic processing of estimating the joint portion temperature using the thermal model, and therefore can constitute the simple cooling system having high control response.

For ensuring the control response of the cooling system, such a manner has been studied that performs the drive control of water pump 66 while fixing target flow rate Q* at the flow rate of the cooling water required when the thermal load attains the maximum, regardless of whether the element temperature is high or low. According to this manner, since water pump 66 is always driven with the maximum electric power, the rapid rising of the element temperature can be suppressed. Therefore, overheating of inverter 14 can be reliably prevented.

However, the above manner wastefully increases the electric power consumption of water pump 66. This increases the fuel consumption in the vehicle equipped with such cooling system.

Conversely, the embodiment of the invention ensures the control response of the cooling capacity with respect to the temperature rising of inverter 14 so that appropriate target flow rate Q* can be set with respect to the magnitude of temperature rising of inverter 14 that varies according to the required output of AC motor M1. Therefore, the drive efficiency of water pump 66 can be increased, and the electric power consumption can be reduced. Consequently, the fuel consumption of the vehicle can be improved.

FIG. 6 is a flowchart for illustrating the drive control of water pump 66 according to the embodiment of the invention.

Referring to FIG. 6, when drive controller 430 receives current instructions Id* and Iq* from current instruction converting unit 410 in the inverter control circuit (step S01), it extracts target flow rate Q* corresponding to current instructions Id* and Iq* that are given from the target flow rate setting map (see FIG. 4) prestored in a storage area, and sets it as target flow rate Q* (step S02).

Drive controller 430 produces signal PWR for driving water pump 66 to circulate the cooling water at target flow rate Q* thus set, and provides it to water pump 66 (step S03). Water pump 66 operates at the revolution speed controlled according to signal PWR from drive controller 430, and circulates the cooling water through coolant passages 50-56 at the flow rate equal to target flow rate Q*.

The embodiment of the invention is configured to perform the drive control of water pump 66 based on current instructions Id* and Iq*, but may be configured to perform the drive control of radiator fan 64 in addition to water pump 66.

As described above, the embodiment of the invention can increase the cooling capacity with good response for the inverter of which temperature rising is expected so that the inverter can be reliably protected from overheating.

Further, the embodiment can set an appropriate cooling capacity with respect to the magnitude of temperature rising of the inverter that varies according to the required motor output. Thereby, the electric power consumption can be improved as compared with the conventional cooling system in which the cooling device must always be set to the maximum capacity due to inferior response. Consequently, it is possible to improve the fuel consumption of the vehicle equipped with the motor drive device according to the invention.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The invention can be applied to the motor control device mounted on the vehicle.

The invention claimed is:
1. A motor drive device comprising:
a drive circuit performing electric power conversion between a power supply and a motor by a switching operation of a switching element;

a control device including a cooling device drive controller which controls a cooling device and a current instruction converting unit which generates a current instruction for performing switching control on said switching element such that a drive current of said motor matches with said current instruction produced from a required output of said motor; and a cooling device cooling said drive circuit with coolant;

wherein said cooling device drive controller controls a quantity of said coolant supplied to said drive circuit based on said current instruction generated by said current instruction converting unit.

2. The motor drive device according to claim 1, wherein said cooling device drive controller holds a map representing a relationship between said current instruction and the supply quantity of said coolant set based on a quantity of generated heat of said switching element estimated from said current instruction, and determines the supply quantity of said coolant corresponding to said current instruction with reference to said map.

3. A vehicle comprising:
a wheel;
a motor driving said wheel; and
the motor drive device according to claim 2 for driving said motor.

4. A vehicle comprising:
a wheel;
a motor driving said wheel; and
the motor drive device according to claim 1 for driving said motor.

* * * * *